United States Patent [19]

Yamashita et al.

[11] Patent Number: 4,860,093

[45] Date of Patent: Aug. 22, 1989

[54] METHOD AND APPARATUS FOR DRIVING A PLURALITY OF PICK-UP TUBES HAVING THEIR CATHODES SUPPLIED BY A COMMON NEGATIVE POTENTIAL

[75] Inventors: Takashi Yamashita, Sagamihara; Keiichi Shidara, Tama; Masaaki Aiba, Tokyo; Yukio Takasaki, Kawasaki; Tadaaki Hirai, Koganei, all of Japan

[73] Assignees: Hitachi, Ltd.; Nippon Hoso Kyokai, both of Tokyo, Japan

[21] Appl. No.: 143,655

[22] Filed: Jan. 13, 1988

[30] Foreign Application Priority Data

Jan. 14, 1987 [JP] Japan .................................. 62-4874

[51] Int. Cl.[4] .................. H04N 9/09; H04N 3/18; H04N 5/228; H04N 9/73
[52] U.S. Cl. ...................................... 358/50; 358/29; 358/41
[58] Field of Search .................. 358/29 C, 50, 51, 52, 358/41

[56] References Cited

FOREIGN PATENT DOCUMENTS 2011673  9/1971  Fed. Rep. of Germany .... 358/29 C
47-11933  4/1972  Japan ...................................... 358/50
49-24619  3/1974  Japan .
54-105429  8/1979  Japan .................................. 358/29 C Primary Examiner—James J. Groody
Assistant Examiner—Randall S. Svihla
Attorney, Agent, or Firm—Antonelli, Terry & Wands

[57] ABSTRACT

The present invention relates to a method and an apparatus for driving image pick-up tubes in, particular, a color television camera or the like having more than one image pick-up tube and in particular to a method and an apparatus for driving image pick-up tubes in which the potentials of the cathode electrodes of the respective image pick-up tubes are set to the same common potential, the potential of the target electrode of at least one of the image pick-up tubes is set substantially to earth potential, target drive potentials are individually applied to the target electrodes of the other image pick-up tubes, and the target potential of each image pick-up tube is set to a value near the earth potential, so that a high S/N ratio is obtained. The driving apparatus can be miniaturized and easily driven. According to the invention, a capacitor, such as a chip capcitor or the like, with a low withstanding voltage can be used in a first-stage amplifier to amplify the video signal from the target electrode. This first-stage amplifier can be arranged near a signal output electrode of the target. Thus, the stray capacitance can be reduced.

18 Claims, 6 Drawing Sheets

METHOD AND APPARATUS FOR DRIVING A PLURALITY OF PICK-UP TUBES HAVING THEIR CATHODES SUPPLIED BY A COMMON NEGATIVE POTENTIAL

CROSS-REFERENCE TO RELATED APPLICATIONS

The present invention is related to subject matter described in U.S. application Ser. No. 69,156 filed July 2, 1987, in the name of K. Tanioka et al, entitled "Photoconductive Device and Method of Operating the Same" and assigned to the assignee of the present application.

BACKGROUND OF THE INVENTION

1. Field of the Invention

The present invention relates to a method and an apparatus for driving image pick-up tubes and, more particularly, to a method and an apparatus for driving image pick-up tubes in the state in which the noises in a signal amplifying system were suppressed. The method and apparatus for driving image pick-up tubes according to the present invention are suitable for use in a color TV camera, a home-use video camera or the like.

2. Description of the Related Art

Various kinds of image pick-up tubes are known, and a photoconductive type image pick-up tube is typical among them. This type of image pick-up tube is characterized by using a photoconductive material in a target portion of the image pick-up tube. Such an image pick-up tube has been disclosed in, e.g., Japanese Kokai 49-24619 (published on Mar. 5, 1974).

According to such a photoconductive type image pick-up tube, a signal current is obtained by driving the image pick-up tube by applying a predetermined voltage to a target portion made of a photoconductive material. Therefore, it is necessary to apply and use a voltage such that the potential of a target electrode arranged in the target portion is set to the positive value to the potential of a cathode electrode. At this time, in the case of, e.g., a color camera using a plurality of image pick-up tubes, the voltage applying method is classified as one of two kinds, dependent on whether of the target electrode or the cathode electrode of each image pick-up tube is grounded. Thus, there is the cathode electrode grounding drive system in which when the voltages which are supplied between the target electrodes and the cathode electrodes of respective image pick-up tubes differ, the potentials on the sides of the cathode electrodes of all of the image pick-up tubes are set to 0 V, and the voltage specified by each image pick-up tube is supplied to each target electrode. The alternative is the target electrode grounding drive system in which the potentials on the sides of the target electrodes of all of the image pick-up tubes are set to 0 V, and the voltage is supplied from each cathode electrode driver to each cathode electrode so as to obtain the specified potential difference between the target electrode and the cathode electrode.

A total of three image pick-up tubes, for the red (R) channel, the green (G) channel, and the blue (B) channel, are generally used in a color camera or the like. Since each image pick-up tube needs to be driven under the conditions suitable for the respective color channel, in a color camera using a plurality of image pick-up tubes it is necessary to supply different voltages between the target electrode and the cathode electrode of each image pick-up tube.

Therefore, in general, either one of the foregoing two systems is selected and used in the color camera.

In the cathode electrode grounding drive system, the S/N (signal current to noise) ratio of the image pick-up tube is given by the following equation.

$$\frac{I_P G}{\sqrt{2eI_P G^2 BF + 4kTB\left[\frac{1}{R}\left(1 + \frac{R_{eq}}{R}\right) + 4\pi^2 C_0^2 R_{eq} B^2\right]}} \quad (1)$$

where, the symbols in equation (1) represent the following:
- e: charge of electrons,
- G: gain of a target of the image pick-up tube,
- $I_p$: incident photon current,
- F: excess noise factory,
- B: band of a signal amplifier,
- k: Boltzmann's constant,
- T: absolute temperature,
- $C_0$: sum of the stray capacitance of the image pick-up tube and the input capacitance of the first-stage amplifier,
- R: load resistance of the image pick-up tube,
- $R_{eq}$: equivalent noise resistance of the first-stage FET.

Therefore, when the image pick-up tube is driven by applying a relatively high voltage between its target electrode and its cathode electrode, it is necessary to use a coupling capacitor with a high withstanding voltage adapted to block the DC components and take out only the signal current components from the load resistance of a target. Therefore, the first-stage FET, signal take-out electrode of the target, and the like cannot be arranged closely and stray capacitance $C_0$ increases. Thus, there is a problem of reduction in the S/N ratio of the amplifier as will be obvious from the equation (1).

On the other hand, in the case of the target electrode grounding drive system, since no DC component is included in the signal current which is derived from the target electrode, the foregoing coupling capacitor with a high withstanding voltage is unnecessary. Therefore, since the stray capacitance decreases by only the amount corresponding to the coupling capacitor, this system is more advantageous in terms of the S/N ratio than the cathode electrode grounding drive system.

However, in the target electrode grounding drive system, since the cathode potentials cannot be commonly set, drivers to supply power sources to all of the electrodes of a plurality of image pick-up tubes are individually needed. Thus, a constitution of the drivers increases and the weight, size, and electric power requirement of the color camera increase, so that this system is undesirable for reduction in size and weight of the camera.

The image pick-up tubes of the blocking type structure which are at present most frequently used have operating characteristics such that the output signal current exhibits a saturation tendency to the target voltage, and the target gain is up to 1 under the ideal conditions. Namely, in the case of the conventional image pick-up tubes of the blocking type structure, the signal current barely depends on the voltage between the target electrode and the cathode electrode. Therefore, a color television camera using a plurality of such image pick-up tubes of the blocking type structure is generally used by applying the same predetermined voltage to each cathode electrode and each target electrode. As explained above, in a color TV camera using a system in which a common potential difference is set between each target electrode and each cathode electrode of a plurality of image pick-up tubes to thereby operate them, it is common that the image signal processor system of the camera is adjusted so as to obtain the best image when an object is photographed under the standard image pick-up condition, i.e., under the illumination of the color temperature within a range from 3000° to 3200° K.

However, if the camera which has previously been adjusted so as to be adapted to only a specific image pick-up environment is used under another image pick-up circumstance, or in the case where such a camera must be used under different image pick-up circumstances, the following inconveniences occur.

Namely, for example, if the color camera which has previously been adjusted as mentioned above is used in the outdoors in the daytime or evening where the color temperatures of the incident lights differ, the balance of the signal currents of each channel changes, so that an image having a good color reproducibility is not obtained. To avoid this, hitherto, a color temperature converting filter is inserted in an optical path of the optical system to thereby change the color temperature of the incident lights to the color temperature near 3000° K. in a manner such that the balance of the signal current of each channel does not greatly deviate from a desired value, and thereafter the gain of the amplifier is again adjusted and the color camera is used.

Further, in the case of photographing an image in the evening or a dark image at a place where an enough illumination is not obtained, not only the color temperature of the incident light changes but also the input signal level of the amplifier of each channel decreases. Therefore, it is also necessary to increase the gain of the amplifier so as to obtain a predetermined input signal level and to correct the color reproducibility, thereby obtaining a video image.

As explained above, in the system in which a common potential difference is set between each target electrode and each cathode electrode of a plurality of image pick-up tubes, the gain of the amplifier needs to be adjusted. Therefore, the gain of the amplifier of at least one of the channels must be increased, causing a problem such that the noise of the amplifier becomes conspicuous by only the amount corresponding to the increased gain. Further, since the operating dynamic range changes with the increase in the gain of the amplifier, there is a problem that it is necessary to perform complicated readjustments of the video signal processor system of the camera, such as white balance, gamma balance, shading correction, and the like.

In addition, even if the cathode electrode grounding drive system or target electrode grounding drive system is used to set the different potential difference between each target electrode and each cathode electrode of a plurality of image pick-up tubes, a camera suitable for a practical use cannot be obtained because these drive systems still have the problem of the reduction in S/N ratio of the amplifier as mentioned above, complication and increase in size of the constitution of the power source drivers.

SUMMARY OF THE INVENTION

It is an object of the present invention to provide a method and an apparatus for driving image pick-up tubes which can solve the foregoing problems in the conventional method and apparatus for driving image pick-up tubes and can easily drive the image pick-up tubes.

Another object of the invention is to provide a method and an apparatus for driving image pick-up tubes in which the S/N ratio does not deteriorate.

Still another object of the invention is to provide a method and an apparatus for driving image pick-up tubes which are adapted for reduction in size and weight of an apparatus such as a camera or the like because the constitution of power drivers necessary to drive the image pick-up tubes is simple.

A further object of the invention is to provide a method and a apparatus for driving image pick-up tubes which are suitable for use in an image pick-up tube which is driven by applying a relatively high voltage between the target electrode and the cathode electrode of the image pick-up tube.

A further object of the invention is to provide a method and an apparatus for driving image pick-up tubes which can easily follow changes in various kinds of image pick-up conditions.

A further object of the invention is to provide a method and an apparatus for driving image pick-up tubes which enable a plurality of image pick-up tubes to execute the optimum operations, respectively.

To accomplish the above and other objects, a method and an apparatus for driving image pick-up tubes according to an aspect of the invention are characterized in that a common negative voltage is supplied to each cathode electrode of a plurality of image pick-up tubes, the voltage of a target electrode of at least one first image pick-up tube among the plurality of image pick-up tubes is substantially set to an earth potential, and target electrode drive voltages are individually supplied to the target electrodes of the second image pick-up tubes other than the first image pick-up tube, thereby driving the image pick-up tubes. Therefore, the potentials of the target electrodes of the plurality of image pick-up tubes can be set to values which are very close to the earth potential, and a coupling capacitor with a low withstanding voltage can be used. Thus, the first-stage FET and capacitor can be arranged near the signal output electrode of the target.

According to the method and apparatus for driving image pick-up tubes of an embodiment of the invention, the constitution of the electrode power drivers of the image pick-up tubes can be minimized, and the image pick-up tubes can be easily driven without deteriorating the S/N ratio of the amplifier.

DESCRIPTION OF THE PREFERRED EMBODIMENTS

To constitute a camera having a large S/N ratio in a camera using a plurality of image pick-up tubes, a voltage such as to make each image pick-up tube perform the optimum operation, i.e., to obtain the maximum S/N ratio of each image pick-up tube, needs to be supplied between the target electrode and the cathode electrode of the image pick-up tube of each channel. Due to this, it is possible to obtain a camera in which the total S/N ratio is high. At this time, if the cathode electrode grounding drive system or target electrode grounding drive system, as mentioned in the description of the related art, is used, various kinds of problems occur as mentioned above, and the objects of the present invention cannot b accomplished.

The inventors of the present application have found the following points. Namely, a common negative voltage is supplied to the cathode electrodes of all of a plurality of image pick-up tubes. The cathode potential is set so that the voltage of the target electrode of at least one of the image pick-up tubes can operate at the zero voltage. Voltages are supplied from individual drivers to the target electrodes of the image pick-up tubes other than that one image pick-up tube in a manner such that the potential difference between the target electrode and the cathode electrode is set to a predetermined optimum value. Due to this, an increase in the size of the power drivers can be avoided without losing the advantage of the target electrode grounding drive system to the S/N ratio. Therefore, the size and weight of the camera can be reduced with a high S/N ratio. Thus, this method is very effective.

The inventors also have found that the invention can be particularly effectively applied to camera or the like using an image pick-up tube in which a relatively high electric field is applied between the target electrode and the cathode electrode of the image pick-up tube. As such an image pick-up tube, for example, there is an image pick-up tube using a charge multiplying function of an amorphous semiconductor. The operating principle of this image pick-up tube will now be explained hereinbelow.

The inventors of the present application have found out that when a strong electric field is applied to an amorphous semiconductor layer, such as amorphous selenium or the like, a charge multiplying function occurs in the amorphous semiconductor. Such a charge multiplying phenomenon in the amorphous semiconductor has been first discovered by the inventors of the present application.

Figure 1:
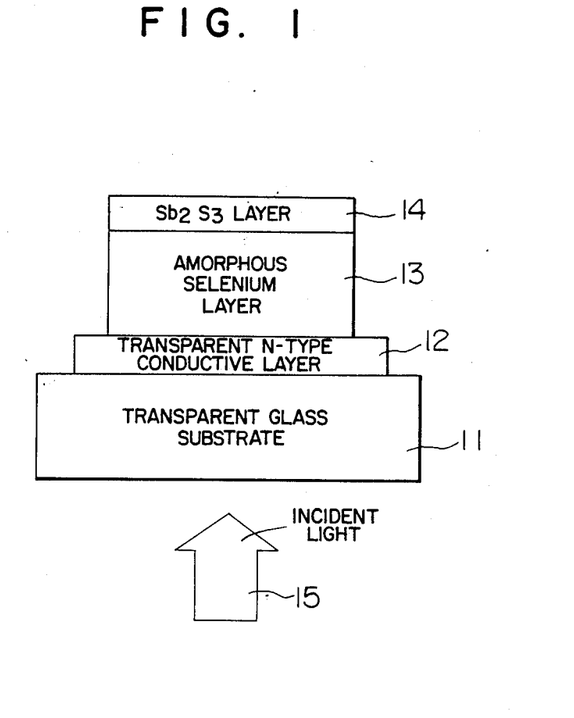
FIG. 1 is a diagram for explaining a target portion of an image pick-up tube suitable for use in a method and an apparatus for driving image pick-up tubes according to the present invention.
Figure 2:
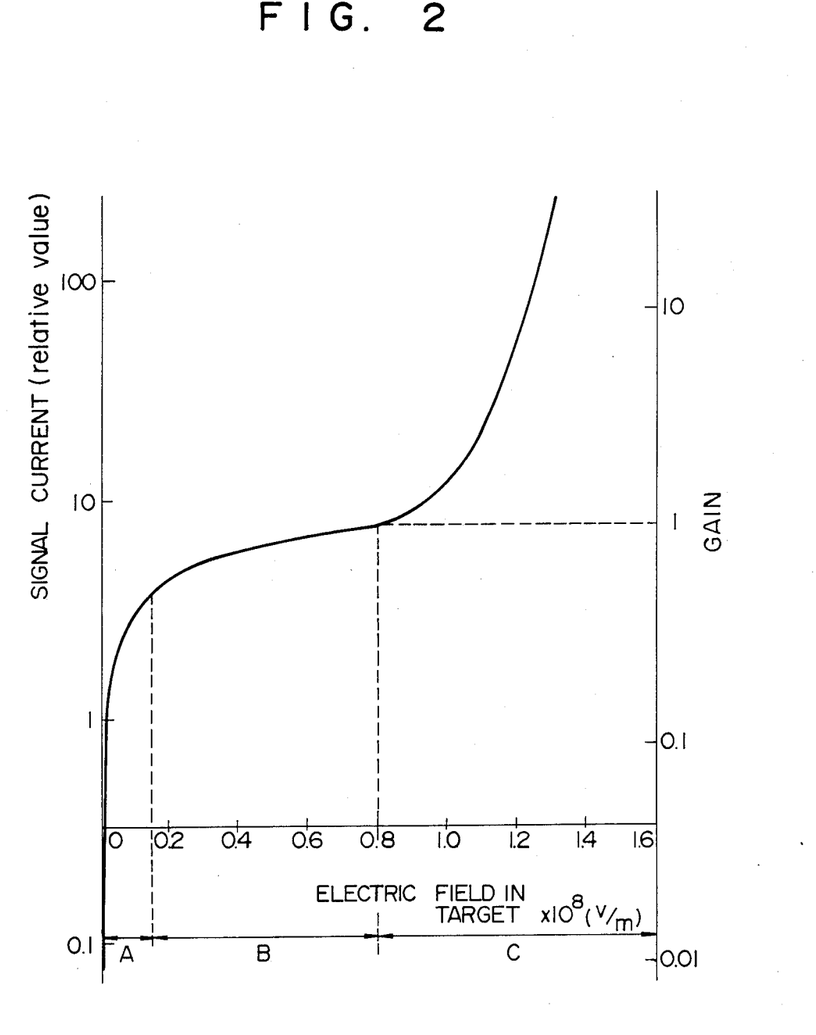
FIG. 2 is a diagram showing the characteristics of a signal current in an amorphous selenium layer which is used in the target portion of the image pick-up tube shown in FIG. 1 and an electric field in the target.

The foregoing effects will be practically explained with reference to FIGS. 1 and 2. As shown in FIG. 1, a target portion of an image pick-up tube is constituted by sequentially depositing a transparent N type conductive layer 12, an amorphous selenium (Se) layer 13, and an $Sb_2S_3$ layer 14 on a transparent glass substrate 11. FIG. 2 shows an example of the relation between the output signal current in the target portion and the target voltage. In FIG. 1, a voltage is applied so that the N type conductive layer 12 is set to a positive potential relative to the $Sb_2S_3$ layer 14. The relation between the photosignal current and the applied voltage when light 15 is illuminated from the side of the glass substrate 11 in this state is shown in FIG. 2. The target voltage is shown as the intensity of the electric field (an axis of abscissa) in FIG. 2.

The interface between the transparent N type conductive layer 12 and the amorphous Se layer 13 provides a rectifying function adapted to block the injection of holes. On the other hand, the $Sb_2S_3$ layer 14 provides the function of preventing the inflow of scanning electrons into the amorphous Se layer 13. Therefore, the target of this image pick-up tube operates as what is called a blocking type target. It will be obviously understood from FIG. 2 that the relation between the signal current and the applied voltage can be divided into three regions of A, B and C.

In the region A, pairs of electrons and holes are generated in the amorphous Se layer 13 by the incident light 15 which has passed through the transparent glass substrate 11. Parts of the electron/hole pairs are separated by the applied voltage. The electrons move toward the transparent electrode 12, and the holes arrive at the blocking layer 14 and are read out by a scanning electron beam. In this electric field region, the signal current increases with an increase in electric field. However, since the influence of the recombination by the electrons and holes is large, the gain of the target is 1 or less.

In the region B where the electric field in the target is further increased, almost of the electron/hole pairs generated by the incident light 15 are separated by the electric field and run toward the transparent conductive layer 12 and blocking layer 14 without being recombined with each other. In the region B, there is a tendency that the signal current is saturated, and the signal current becomes maximum only when all of the incident light is converted into the electron/hole pairs and taken out as signal current. Therefore, the gain of the target is up to 1. The conventional image pick-up tube using a blocking type target is operated in the range of the region A or B mentioned above.

The inventors of the present application have found out that in the case of a photoconductive layer made of an amorphous Se layer, when the electric field in the target is further increased from the region B, there occurs a phenomenon (charge multiplying function) such that the signal current suddenly increases as shown in the region C, and the gain exceeds 1. Therefore, the image pick-up tube of high sensitivity can be easily obtained by use of the foregoing phenomenon.

However, when using the image pick-up tube of a high sensitivity which uses the charge multiplying function of the amorphous semiconductor as mentioned above, as will be understood from FIG. 2, it is necessary to apply a high voltage between the target electrode and the cathode electrode. On the other hand, it will be understood from this diagram that the signal current can be also easily changed a large amount by slightly changing the voltage between the target electrode and the cathode electrode.

Therefore, the remarkable effect is obtained when the method of driving image pick-up tubes according to the invention is applied to a color camera or the like using image pick-up tubes having, especially, characteristics between the signal current and the electric field in the target as shown in FIG. 2. Namely, since the image pick-up tube which causes the charges to be multiplied in the photoconductive target is made operative in, e.g., the region C in FIG. 2, by slightly changing the voltage which is supplied between the target electrode and the cathode electrode, the gain of the target can be changed a large amount. The invention intends to obtain a desired signal current by applying the voltages from the individual power drivers between the target electrodes and the cathode electrodes of the image pick-up tubes which are used in the respective channels. Therefore, according to the driving method of the invention, even if the signal current decreases due to a change in image pick-up condition, the signal current can be increased by raising the gain of the target without adjusting the gain of the amplifier.

Therefore, according to the method and apparatus for driving image pick-up tubes of the invention, deterioration in the S/N ratio due to the gain adjustment of the amplifier does not occur. Further, since there is no need to perform complicated adjustments of the video signal processor system of the camera, a video image of an excellent color reproducibility can be always promptly and easily obtained. At this time, in this invention, since the potential of the target electrode of a special one (first) image pick-up tube among a plurality of image pick-up tubes is set to a reference potential, (0 V), i.e., earth potential and the image pick-up tube is made operative, a first-stage FET to amplify the signal current and a load resistor R in the first image pick-up tube can be directly coupled. Therefore, not only can the coupling capacitor C be omitted, but also the first-stage FET can be arranged near the signal output electrode of the target, and the stray capacitance can be reduced. Next, a negative voltage is supplied from the power driver common to that for the first image pick-up tube to the cathode electrodes of the other image pick-up tubes. On the other hand, voltages from individual auxiliary target power drivers are supplied to the target electrodes of the image pick-up tubes other than the first image pick-up tube between the target electrode and the cathode electrode is set to a desired value. With this construction, even if the voltages between the target electrodes and the cathode electrodes differ, the difference between the potential of the target electrode of each of the image pick-up tubes and the reference potential is small, so that a coupling capacitor to block the DC components with a low withstanding voltage can be used. Therefore, for example, a small chip capacitor can be used, and the first-stage FET and the capacitor can be arranged near the signal output electrode of the target. Thus, deterioration in S/N ratio can be suppressed.

As mentioned above, according to the invention, the power driver section can be miniaturized without deteriorating the S/N ratio.

To obtain a high S/N ratio in the color camera using a plurality of image pick-up tubes, it is desirable to use the image pick-up tube of the channel which will exert a large influence on the S/N ratio as the special (i.e., the first) image pick-up tube. More specifically speaking, for example, the S/N ratio of a luminance signal Y of a three-tube type color camera of the NTSC system is expressed by the following equation.

$$S/N \text{ ratio} = \frac{Y}{\sqrt{e_{yn}^2}} = \frac{0.30 E_R + 0.59 E_G + 0.11 E_B}{\sqrt{0.30^2 e_{RN}^2 + 0.59^2 e_{Gn}^2 + 0.11^2 e_{Bn}^2}} \quad (2)$$

where, Y: luminance signal level,
$e^2 yn$: noise components included in the luminance signal mean square value,
$E_R$, $E_G$, $E_B$: output levels of the amplifiers of the channels of red, green and blue, and
$e^2 Rn$, $e^2 Gn$, $e^2 Bn$: noise components included in the signals of the channels of red, green and blue, mean square value.

Therefore, among the contribution ratios of the signals of the respective channels to the luminance signal in the S/N ratio, the contribution ratio of the signal component of the green channel is the largest. Therefore, by applying the image pick-up tube which is made operative by setting the potential of the target electrode to the reference potential of 0 V to the green channel, the S/N ratio can be set to the highest value as will be understood from the equation (2).

Further, by constituting in a manner such that an automatic gain control device of the signal current is provided and an output of a video signal amplifier is returned to a voltage setting operational amplifier, and power drivers to apply the voltages between the cathode electrodes and the target electrodes are controlled, there are advantages such that the gain of the target of each image pick-up tube can be automatically adjusted, and this automatic gain control device can be used as a device to automatically adjust the white balance.

The present invention will now be explained in detail hereinbelow with respect to Examples.

EXAMPLE 1

Figure 3:
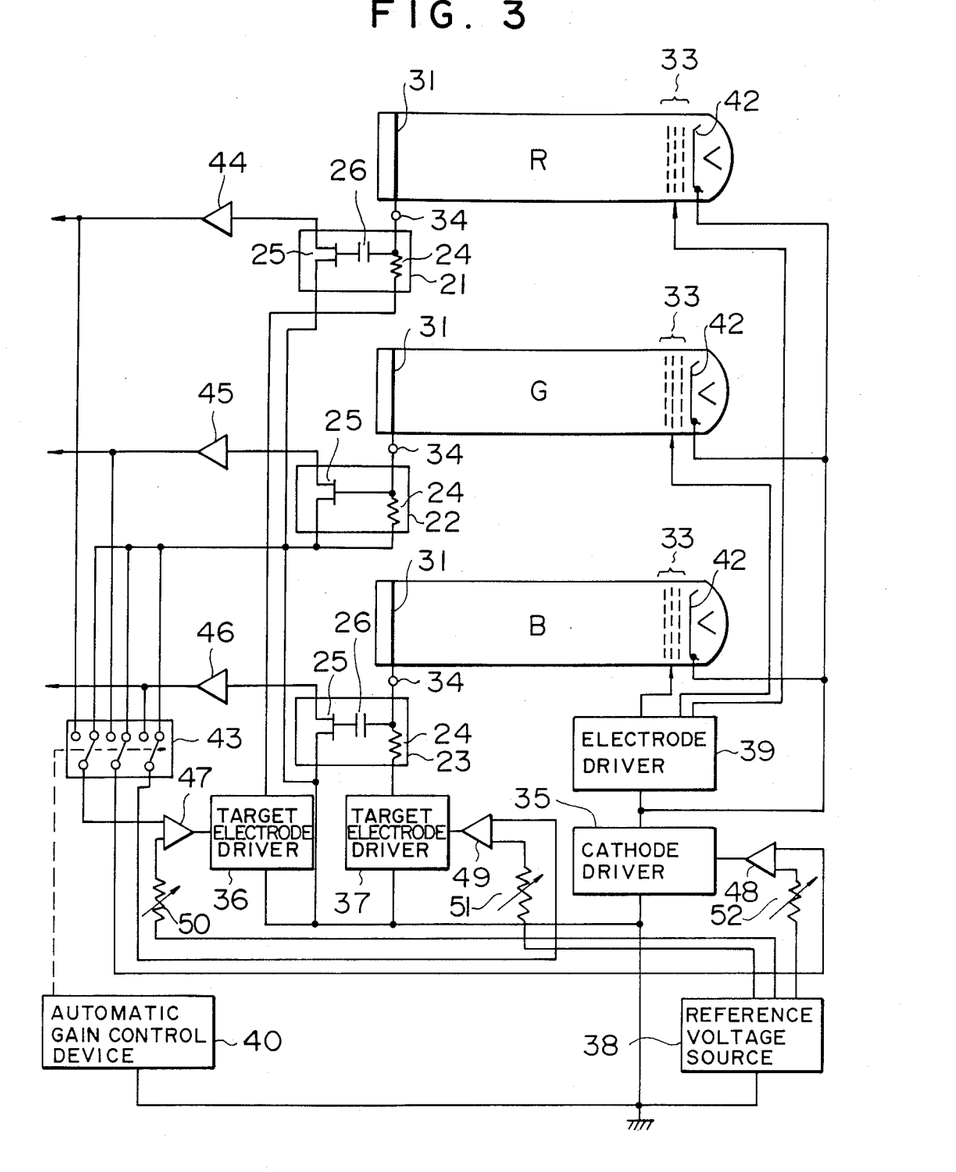
FIG. 3 is a diagram for explaining one embodiment of a method and an apparatus for driving image pick-up tubes according to the invention.

FIG. 3 shows an embodiment of a power driver to drive the electrodes of the image pick-up tubes according to the invention. A target electrode 31 of each image pick-up tube is connected to an external circuit by a signal output electrode 34. Although the structure of the target portion is omitted in FIG. 3, each of the target electrodes 31 is the transparent electrode arranged on the substrate side and corresponds to the transparent N type conductive layer 12 shown in FIG. 1. Because the voltage of the target electrode of an image pick-up tube for green (hereinafter, referred to as an image pick-up tube G) is set to 0 V, a first-stage FET 25, to amplify the signal current, and a load resistor 24 are directly connected to the signal current output electrode 34, and a coupling capacitor is omitted. The load resistor 24 and first-stage FET 25 are arranged near the signal output electrode 34 of the target, thereby forming a close arrangement type first-stage amplifier 22. An output terminal of the first-stage amplifier 22 is connected to an amplifier 45. A common negative voltage is supplied from a common cathode driver 35 to cathode electrodes 42 of the image pick-up tube G, an image pick-up tube for red (hereinafter, referred to as an image pick-up tube R), and an image pick-up tube for blue (hereinafter, referred to as an image pick-up tube B). Scanning electron beams of the image pick-up tubes G, R and B are converged and deflected by electrode groups 33. A desired voltage is supplied to the electrode groups 33 from an electrode driver 39 provided between the electrode groups 33 and the cathode driver 35.

The signal current output electrodes 34 of the image pick-up tubes R and B are connected to close arrangement type first-stage amplifiers 21 and 23, respectively, each consisting of the load resistor 24, first-stage FET 25, and a coupling capacitor 26, respectively. In this case, the first-stage amplifiers 21 and 23 are arranged near the signal output electrodes 34 of the targets. Output terminals of the first-stage amplifiers 21 and 23 are connected to amplifiers 44 and 46, respectively. Voltages are supplied from target electrode drivers 36 and 37 to the first-stage amplifiers 21 and 23, respectively. The cathode driver 35 and target electrode drivers 36 and 37 control the voltages by voltage setting operational amplifiers 48, 47, and 49 and variable resistors 52, 50, and 51, and a reference voltage source 38, respectively.

The outputs of the amplifiers 44, 45, and 46 are returned or fed back to the voltage setting operational amplifiers 47, 48, and 49, and so the power drivers for the cathode electrodes 42 and target electrodes 31 are controlled. Due to this, the gain of the target is automatically adjusted by an automatic gain control device 40 of the signal current so as to obtain a predetermined signal current, so that the white balance can be automatically adjusted. In the driving apparatus shown in FIG. 3, adjustment for the white balance can be effected either automatically or manually by operating a switch 43.

With the foregoing construction, the voltage between the target electrode and ground in each image pick-up tube can be reduced, so that a coupling capacitor with a low withstanding voltage can be used as the coupling capacitor 26 to block the DC components. It is sufficient to use a chip capacitor of 50 WV or less as the coupling capacitor 26. Therefore, the first-stage FET 25 and capacitor 26 can be arranged near the signal output electrode 34 of the target. Assuming that the signal current is 0.2 $\mu A_{pp}$ and the video signal frequency band is 4.2 MHz, a S/N ratio of the amplifier of 59 dB or more can be obtained.

EXAMPLE 2

Figure 4:
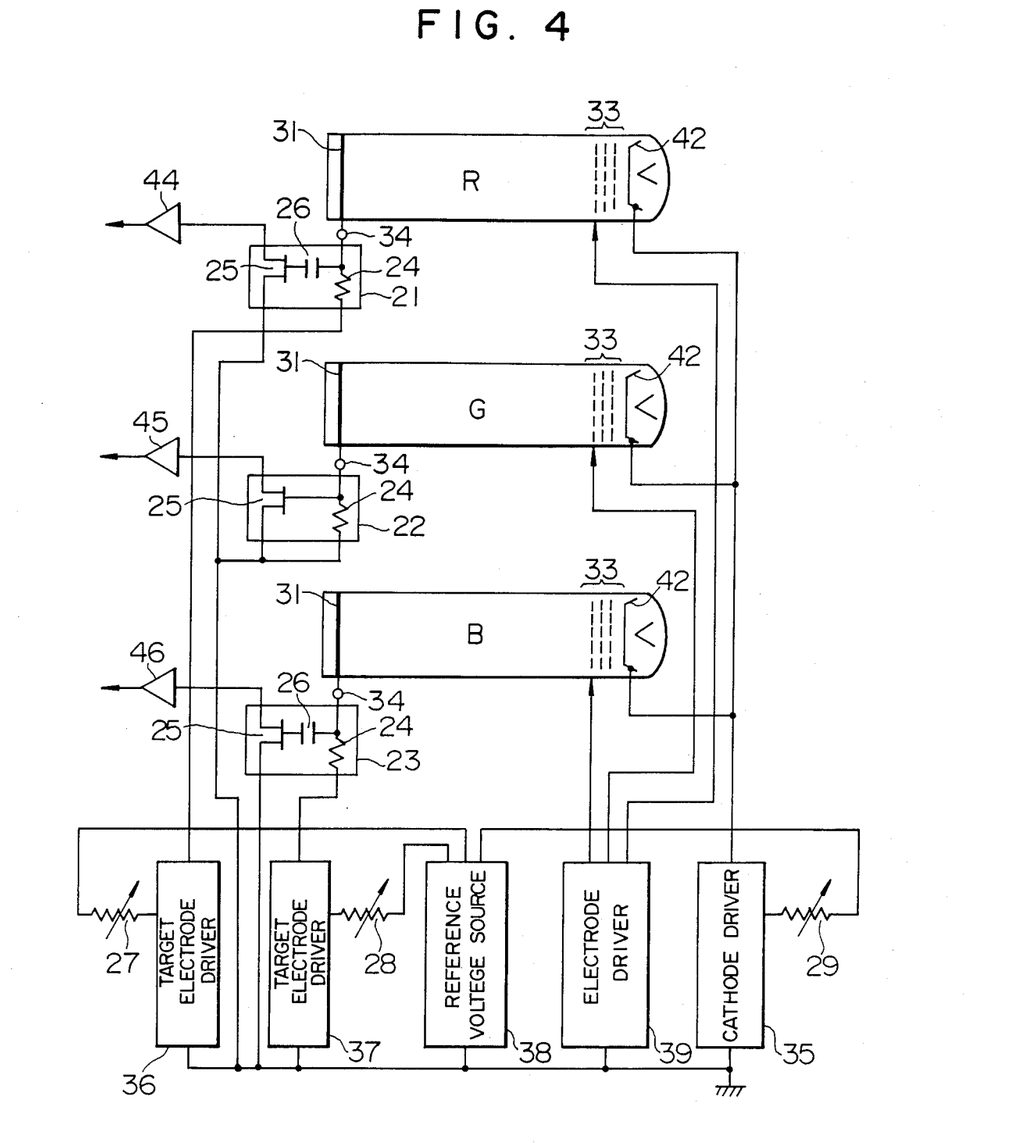
FIG. 4 is a diagram for explaining another embodiment of a method and an apparatus for driving image pick-up tubes according to the invention in the case where the image pick-up tubes are made operative by fixing the gain of the target.

FIG. 4 shows a driving method in the case where the image pick-up tubes are made operative by setting the gain of the target of the image pick-up tube to a fixed value. The fundamental construction of this example is substantially the same as Example 1. In the case of Example 2, the electrode driver 39, for supplying voltage to the electrode groups 33 of the image pick-up tubes, is grounded. On the other hand, the cathode driver 35 and target electrode drivers 36 and 37 are adjusted by correspondingly variable resistors 29, 27, 28 and by reference voltage source 38. A circuit to automatically control the gain of the target is not included in Example 2.

With the above constructing, the withstanding voltages of the parts which are used in the electrode drivers can be reduced by only the amount corresponding to the cathode voltage and one side of the electrode driver can be grounded. Thus, there is an advantage that the circuit can be easily manufactured.

EXAMPLE 3

Figure 5:
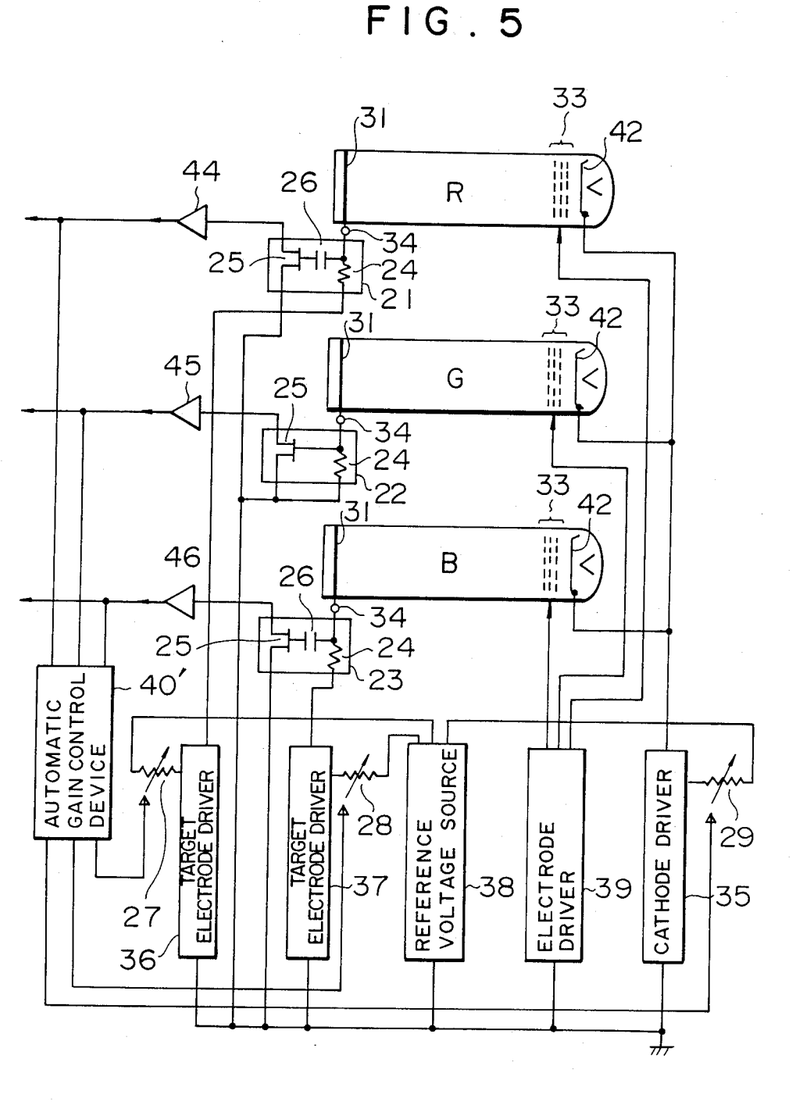
FIG. 5 is a diagram for explaining still another embodiment of a method and an apparatus for driving image pick-up tubes according to the invention in the case where an automatic gain control device of a signal current is used.

FIG. 5 shows an example in which an automatic gain control device for the signal current is combined with the construction shown in FIG. 4. In a manner similar to Examples 1 and 2, a constant cathode voltage is applied to each of the image pick-up tubes R, G, and B, and independent target electrode voltages are respectively applied to the image pick-up tubes of the R and B channels. The cathode voltage and target electrode voltages are determined by the variable resistors 29, 27, and 28. Signal currents from the amplifiers 44, 45, and 46 are returned to the variable resistors 29, 27, and 28 through an automatic gain control device 40'. The gain of the target of each image pick-up tube is automatically adjusted. The white balance can be automatically adjusted.

EXAMPLE 4

Figure 6:
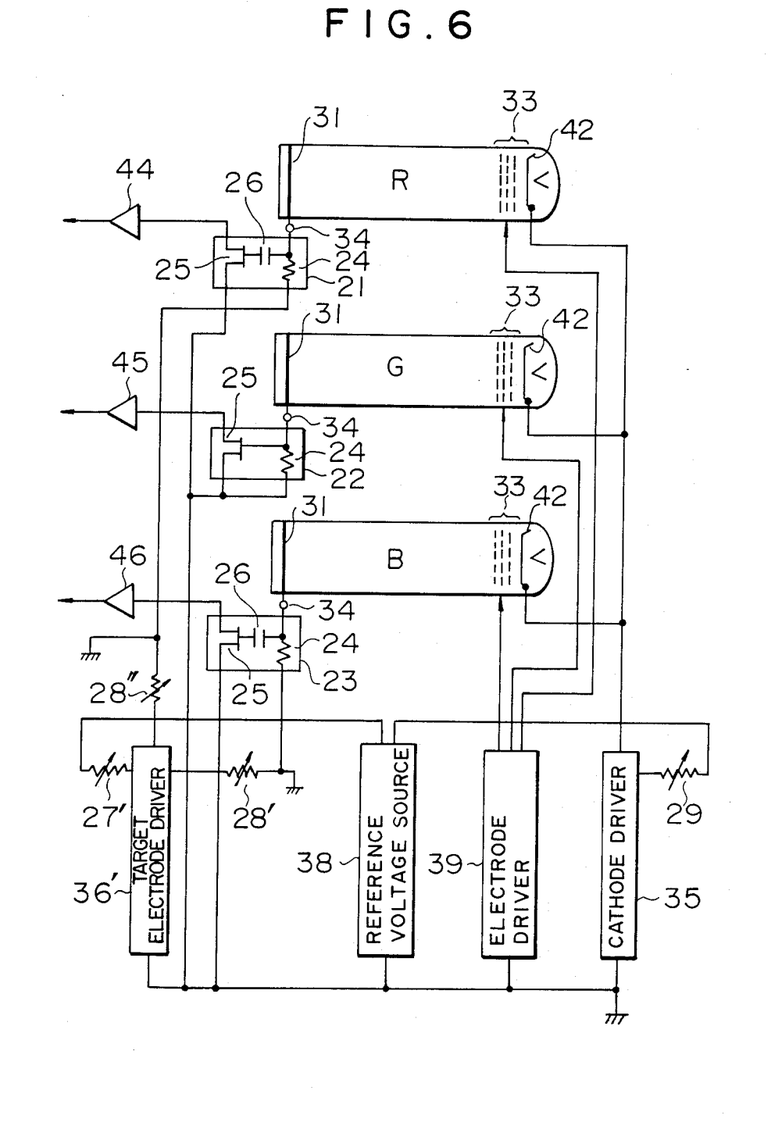
FIG. 6 is a diagram for explaining yet another embodiment of a method and an apparatus for driving image pick-up tubes according to the invention in the case where target electrode drivers of a plurality of image pick-up tubes are commonly used.

FIG. 6 shows an example in the case where a common target electrode driver 36' is used for the image pick-up tubes R and B. Target voltages to the image pick-up tubes R and B are adjusted by variable resistors 27', 28', and 28''. In this case, since the number of drivers is reduced by one as compared with the foregoing three examples, the circuit construction is simplified.

Although a common negative potential has been applied to the cathode electrode of each image pick-up tube in the foregoing examples, it is sufficient that this potential be substantially the same potential.

We claim:

1. A method of driving a plurality of image pick-up tubes, each having a target including a transparent substrate, a target electrode formed on the substrate and a photoelectric converting layer formed on the target electrode to convert incident signal light into an electric signal, a cathode electrode to emit a scanning electron beam, and a group of electrodes to converge and deflect the scanning electron beam on the target, said method comprising the steps of:
   supplying a substantially common negative potential to the cathode electrode of each of the plurality of image pick-up tubes;
   setting the target electrode of at least one image pick-up tube of said plurality of image pick-up tubes at substantially earth potential; and
   supplying potentials to the target electrodes of the remaining image pick-up tubes of said plurality of image pick-up tubes so as to drive said target electrodes.

2. A method according to claim 1, wherein said plurality of image pick-up tubes are three image pick-up tubes for green, red, and blue.

3. A method according to claim 2, wherein said at least one image pick-up tube is the image pick-up tube for green.

4. A method according to claim 1, further comprising amplifying a video signal from each of the target electrodes and returning the amplified signal as a feedback potential to control the potential difference between the target electrode and the cathode electrode of the corresponding image pick-up tube, thereby adjusting the gain of the target of the corresponding image pick-up tube.

5. An apparatus for driving a plurality of image pick-up tubes each having a target electrode, a cathode electrode, and a group of electrodes for scanning electron beam control, said apparatus comprising:

a cathode driver for applying a substantially common negative potential to the cathode electrode of each of the plurality of image pick-up tubes;

means for maintaining the target electrode of one of the image pick-up tubes at substantially earth potential; and at least one target electrode driver for applying a target electrode driving potential to the target electrode of search of the remaining image pick-up tubes.

6. An apparatus according to claim 5, wherein the one image pick-up tube is an image pick-up tube for green and the remaining image pick-up tubes are image pick-up tubes for red and blue.

7. An apparatus according to claim 5, having as many target electrode drivers as there are remaining image pick-up tubes.

8. An apparatus according to claim 5, having only one target electrode driver and means for applying a target electrode driving potential from said one target electrode driver to the target electrode of each of said remaining image pick-up tubes.

9. An apparatus according to claim 5, wherein said at least one target electrode driver applies a target electrode driving potential to the target electrode of each of the remaining image pick-up tubes such that the potential difference between the target electrode and the cathode electrode of each of the remaining image pick-up tubes is set to a predetermined optimum value.

10. A image pick-up tube apparatus comprising:

a plurality of image pick-up tubes including a first image pick-up tube and at least one second image pick-up tube, each image pick-up tube having a target including a transparent substrate, a target electrode formed on said substrate and a photoelectric converting layer formed on said target electrode to convert incident signal light into an electric signal, a cathode electrode to emit a scanning electron beam, and a group of electrodes to converge and deflect the scanning electron beam on said target;

cathode drive means for supplying a common negative potential to the cathode electrode of each of said plurality of image pick-up tubes;

means for maintaining the target electrode of said first image pick-up tube at substantially earth potential;

at least one target electrode drive means for supplying a target electrode driving potential to the target electrode of each image pick-up tube of said at least one second image pick-up tube;

first amplifying means, connected to the target electrodes of each of said plurality of image pick-up tubes, for amplifying respective output video signals from said target electrodes; and second amplifying means for further amplifying the amplified output video signals from said first amplifying means.

11. An apparatus according to claim 10, wherein said first amplifying means comprises a first FET and load resistor connected to the target electrode of said first image pick-up tube to amplify the output video signal thereof, and at least one second FET, second load resistor, and coupling capacitor connected to the target electrode of each image pick-up tube of said at least one second image pick-up tubes to amplify the output video signals thereof.

12. An apparatus according to claim 10, wherein the photoelectric conveying layer of each target is formed of an amorphous semiconductor.

13. An apparatus according to claim 12, wherein said amorphous semiconductor consists of a material mainly containing Se.

14. An apparatus according to claim 10, having a plurality of second image pick-up tubes and a like plurality of target electrode drive means.

15. An apparatus according to claim 10, having a plurality of second image pick-up tubes and only one target electrode drive means.

16. An apparatus according to claim 10, further comprising signal gain adjusting means for returning the further amplified output video signals form said second amplifying means as feedback potentials to control the potential difference between the target electrode and the cathode electrode of each of said image pick-up tubes.

17. An apparatus according to claim 10 wherein said at least one target electrode drive means supplies a target electrode driving potential to the target electrode of each image pick-up tube of said at least one second image pick-up tube such that the potential difference between the target electrode and the cathode electrode of each image pick-up tube of said at least one second image pick-up tube is set to a predetermined optimum value.

18. A method of driving a plurality of image pick-up tubes, by setting potentials of a target electrode and a cathode of each image pick-up tube so as to obtain a predetermined potential difference between the target electrode and the cathode for each individual image pick-up tube, said method comprising the steps of:

supplying a substantially common negative potential to the cathode of each of the plurality of image pick-up tubes;

setting the target electrode of at least one of the image pick-up tubes at substantially earth potential; and supplying potentials to the target electrodes of the remainder of the image pick-up tubes such that the potential difference between the target electrode and the cathode of each of the remainder of the image pick-up tubes is set to a predetermined optimum value.

* * * * *